United States Patent
Flintham et al.

[11] Patent Number: 6,166,851
[45] Date of Patent: Dec. 26, 2000

[54] OPTICAL AMPLIFIER MANUFACTURE

[75] Inventors: Barrie Flintham, Paignton; Kevan Peter Jones, Totnes; Stephen Andrews, Torquay, all of United Kingdom

[73] Assignee: Nortel Networks Limited, Montreal, Canada

[21] Appl. No.: 09/222,556

[22] Filed: Dec. 29, 1998

[51] Int. Cl.$^7$ ...................................................... H01S 3/00
[52] U.S. Cl. ................................................................ 359/341
[58] Field of Search .................................. 359/341, 124; 385/39

[56] References Cited

U.S. PATENT DOCUMENTS

| | | |
|---|---|---|
| 5,708,740 | 1/1998 | Cullen . |
| 5,959,766 | 9/1999 | Otterbach et al. ..................... 359/337 |
| 5,963,361 | 10/1999 | Taylor et al. ........................... 359/337 |

FOREIGN PATENT DOCUMENTS 2 128 766   5/1984   United Kingdom .

OTHER PUBLICATIONS

Hashimoto et al, Variable Optical Fiber Attenuators, IEEE, pp. 1151–1152, 1999.

*Primary Examiner*—Mark Hellner
*Attorney, Agent, or Firm*—Lee, Mann, Smith, McWilliams, Sweeney & Ohlson

[57] ABSTRACT

A construction of gain tilt exhibiting optical amplifier that incorporates a gain flattening filter also includes a neutral density filter the value of whose attenuation is adjustable after assembly of the components of the amplifier. This neutral density filter is constructed by the performance of a succession of localised re-fusion operations at a localised region of an optical fiber. By this means the attenuation is increased to a desired value that provides the amplifier with optimised gain flattening at some predetermined value of amplifier external gain.

3 Claims, 6 Drawing Sheets

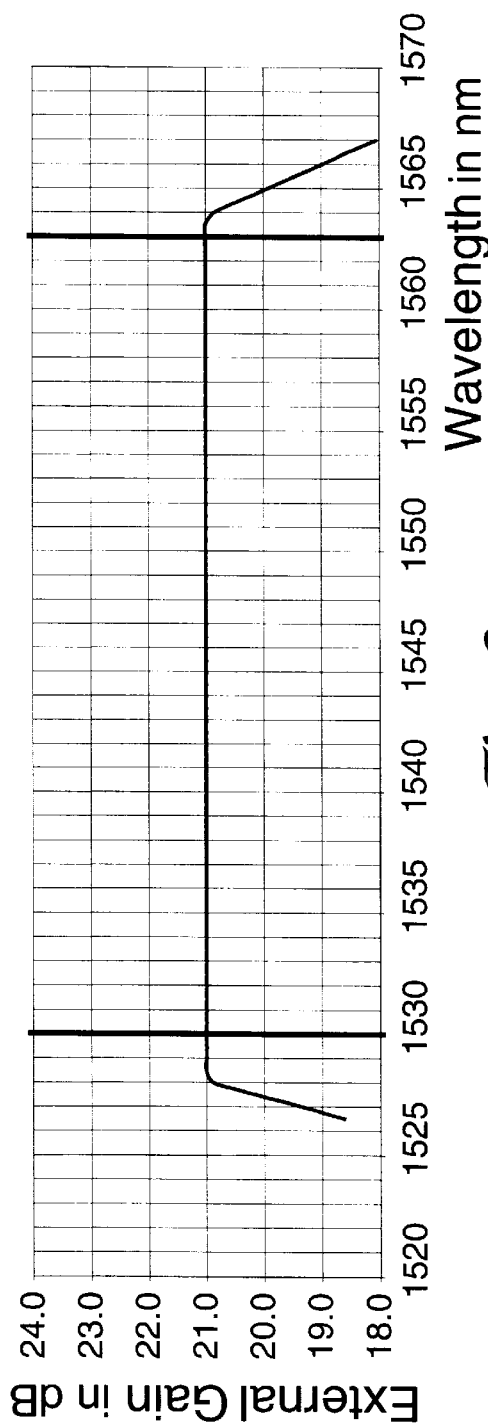
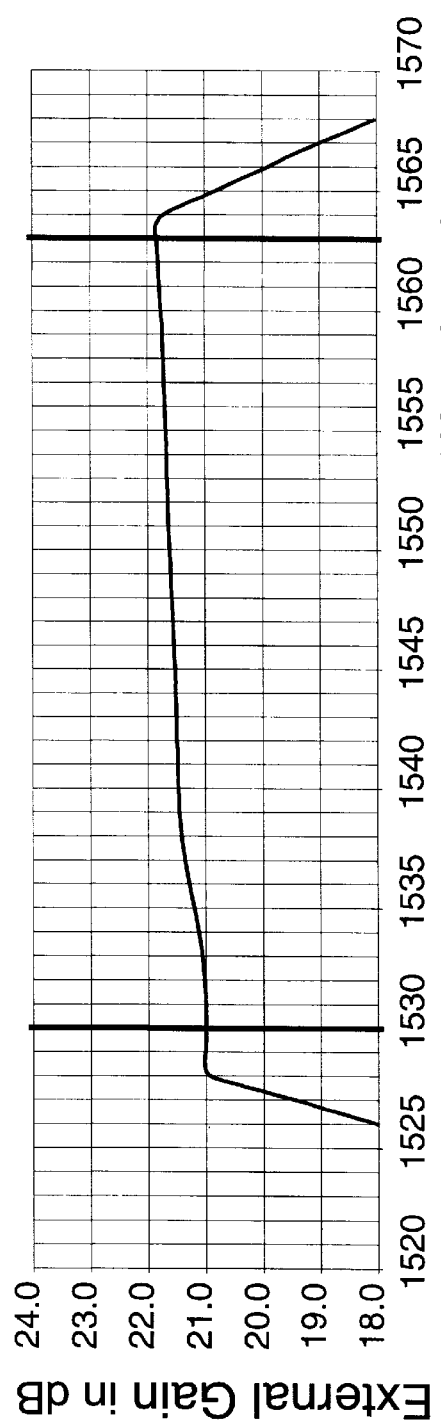

| No. of re-arcs | Arc power | dB loss, short cut-off fibre | dB loss, long cut-off fibre | No. of re-arcs | Arc power | dB loss, short cut-off fibre | dB loss, long cut-off fibre |
|---|---|---|---|---|---|---|---|
| 1 | 8 | 0.00 | 0.00 | 46 | 10 | 3.38 | 1.84 |
| 2 | 8 | 0.01 | 0.02 | 47 | 10 | 3.50 | 1.95 |
| 3 | 8 | 0.03 | 0.04 | 48 | 10 |  | 2.00 |
| 4 | 8 | 0.07 | 0.06 | 49 | 10 |  | 2.01 |
| 5 | 8 | 0.11 | 0.07 | 50 | 10 |  | 1.95 |
| 6 | 8 | 0.15 | 0.08 | 51 | 10 |  | 1.88 |
| 7 | 8 | 0.20 | 0.09 | 52 | 10 |  | 1.80 |
| 8 | 8 | 0.25 | 0.11 | 53 | 10 |  | 1.88 |
| 9 | 8 | 0.30 | 0.12 | 54 | 10 |  | 1.94 |
| 10 | 8 | 0.36 | 0.14 | 55 | 10 |  | 2.04 |
| 11 | 8 | 0.42 | 0.15 | 56 | 10 |  | 2.19 |
| 12 | 8 | 0.48 | 0.16 | 57 | 10 |  | 2.29 |
| 13 | 8 | 0.53 | 0.18 | 58 | 10 |  | 2.41 |
| 14 | 8 | 0.60 | 0.18 | 59 | 10 |  | 2.27 |
| 15 | 8 | 0.65 | 0.21 | 60 | 10 |  | 2.4 |
| 16 | 8 | 0.71 | 0.25 | 61 | 10 |  | 2.58 |
| 17 | 10 | 0.78 | 0.27 | 62 | 10 |  | 2.7 |
| 18 | 10 | 0.87 | 0.27 | 63 | 10 |  | 2.81 |
| 19 | 10 | 0.95 | 0.32 | 64 | 10 |  | 3.00 |
| 20 | 10 | 1.004 | 0.43 | | | | |
| 21 | 10 | 1.12 | 0.40 | | | | |
| 22 | 10 | 1.23 | 0.45 | | | | |
| 23 | 10 | 1.33 | 0.53 | | | | |
| 24 | 10 | 1.44 | 0.56 | | | | |
| 25 | 10 | 1.55 | 0.60 | | | | |
| 26 | 10 | 1.65 | 0.71 | | | | |
| 27 | 10 | 1.75 | 0.71 | | | | |
| 28 | 10 | 1.83 | 0.64 | | | | |
| 29 | 10 | 1.94 | 0.64 | | | | |
| 30 | 10 | 2.04 | 0.69 | | | | |
| 31 | 10 | 2.15 | 0.75 | | | | |
| 32 | 10 | 2.25 | 0.82 | | | | |
| 33 | 10 | 2.35 | 0.92 | | | | |
| 34 | 10 | 2.43 | 0.91 | | | | |
| 35 | 10 | 2.52 | 0.99 | | | | |
| 36 | 10 | 2.6 | 1.05 | | | | |
| 37 | 10 | 2.69 | 1.13 | | | | |
| 38 | 10 | 2.75 | 1.21 | | | | |
| 39 | 10 | 2.82 | 1.26 | | | | |
| 40 | 10 | 2.90 | 1.36 | | | | |
| 41 | 10 | 3.00 | 1.47 | | | | |
| 42 | 10 | 3.06 | 1.51 | | | | |
| 43 | 10 | 3.11 | 1.57 | | | | |
| 44 | 10 | 3.20 | 1.64 | | | | |
| 45 | 10 | 3.31 | 1.74 | | | | |

*Fig. 7.*

OPTICAL AMPLIFIER MANUFACTURE

BACKGROUND OF THE INVENTION

This invention relates to optical amplifier manufacture, and is particularly concerned with the spectral gain characteristics of such amplifiers.

Any given optical amplifier has a finite spectral band over which the amplifier affords optical amplification. Clearly the amplification that it does afford will fade away in magnitude toward the edges of that band. However it has been found that, in the absence of any spectral filtering, the spectral gain characteristic of such an amplifier, for instance an amplifier whose gain medium is constituted by one or more lengths of optically pumped rare earth doped (typically erbium doped) optical fibre, exhibits a marked departure from flatness, not only near the band edges, but also over the intervening spectral range, and also over smaller portions of that intervening range. For many practical applications this lack of flatness is a disadvantage. For instance, if a wavelength division multiplexed WDM signal is to be amplified, it is generally desirable for the amplifier to exhibit substantial flatness over the whole spectral range compassed by the WDM signal. Within at least some portion of the central region of the full amplification band, any specific non-flat spectral gain characteristic can in principle be compensated by the use of a corresponding gain-flattening filter, such as that made by the technique described in U.S. Pat. No. 5,708,740. The spectral profile of any given example of such a filter is a fixed (static) profile, and so is matched only to one specific spectral profile of gain characteristic. The usefulness of such filters for gain-flattening is therefore limited by the fact that the spectral gain characteristic of the amplifier typically varies significantly with drive conditions, a phenomenon known as gain tilt.

In particular the effect of increasing the drive is to increase the gain at shorter wavelengths proportionately more than at the longer wavelengths, i.e. the gain characteristic, when gain is plotted as a function of wavelength, is tilted clockwise. A similar clockwise tilt can alternatively be obtained, not by increasing the drive, but maintaining it in such a way as to provide the same value of gain at some reference wavelength, and instead arranging for the gain to take place over a shorter length of gain medium. It is therefore possible to arrange compensate the clockwise tilt resulting from an increase in drive with a counter-clockwise tilt resulting from the use of a longer length of gain medium.

One of the factors determining the spectral gain characteristic of an optical amplifier whose gain medium is provided by one or more concatenated lengths of optically pumped rare-earth doped optical fibre is the particular 'recipe' (dopant choice, doping level, refractive index profile, core diameter etc) used in the construction of that gain fibre. For a given fibre length, the shape of the gain characteristic is not fully determined by the external gain of the amplifier (i.e. the gain the amplifier shows to the external world between its input and output ports, it is instead determined by the internal gain of the amplifier. The difference between the internal and external gain values of an amplifier is equal to the aggregate loss of the passive components of the amplifier that are in series with the or each region of gain fibre in the optical path optically coupling the input port of the amplifier to it output port.

Consider now the case of an amplifier having, at some particular reference wavelength, $\lambda_{ref}$, an external gain of xdB, aggregate loss of its passive components being ydB, and its external gain being zdb (where x+y=z). Not only is the internal gain value of this amplifier determined, but also its gain medium recipe and length. Therefore the spectral gain characteristic of the gain medium of the amplifier is determined, and therefore it is possible, at least in principle, to construct a gain flattening filter for use in series with the amplifier, either before or after it, that will provide two series combination with optimum spectral flattening (over a predetermined spectral range within the gain medium) when the amplifier is driven in such a way as to provide it with an external gain of xdB.

Now suppose that gain flattening is wanted for a different amplifier required to be driven so as to provide an external gain value of $(x+\Delta x)$dB at $\lambda_{ref}$. Clearly the same gain medium recipe and length can be used, provided that the aggregate loss of the passive components can be reduced to $(y-\Delta x)$dB. An alternative approach would be to employ a drive providing the amplifier with an internal gain of $(z+\Delta z)$ dB at $\lambda_{ref}$, and to compensate for the gain tilt produced by the gain increment by the use of a complementary gain tilt produced by the use of an incrementally lengthened gain medium.

In principle therefore the same design of gain flattening filter can be used for producing optimised gain flattening for amplifiers with different specific value of external gain, choosing in each instance the appropriate length of gain medium having regard to the external gain that that amplifier is required to provide, and also to the aggregate loss value of its passive components.

Only for simplicity of exposition has the foregoing analysis treated the gain flattening filter as being external to the amplifier. However since the gain flattening filter will normally present finite loss, $\Delta y$dB at $\lambda_{ref}$, the external gain of the series combination of amplifier and gain flattening filter will be $\Delta y$dB less than that of the amplifier alone. Normally it is the external gain of the series combination that is significant to the system designer, and so it will generally be more appropriate to treat the gain flattening filter as being an internal constituent part of the amplifier. Under these circumstances the loss $\Delta y$dB presented at $\lambda_{ref}$ by the gain flattening filter is incorporated as part of the aggregate loss of the passive components of the amplifier.

For a given gain medium recipe it is possible, not only to determine the spectral gain characteristic for a specific value of internal gain and gain medium length, but it is also possible to determine how the spectral gain characteristic changes both as a function of internal gain magnitude and as a function of gain medium length. Therefore, in respect of the construction of an amplifier that employs that recipe of gain medium, and that incorporates within it a specific design of gain flattening filter, it is in principle possible to select the requisite length of gain medium to achieve optimised gain flattening for a specific value of external gain at $\lambda_{ref}$ once the value of the aggregate loss of the passive components of that amplifier at $\lambda_{ref}$ is known. As estimate of this aggregate loss can be arrived at by assembling all the components of the amplifier except for the length of lengths of amplifying medium (optical fibre) of that amplifier. The place of the or each such length of amplifying fibre is taken by a temporary fusion splice. The actual aggregate loss of these components can then be measured. To this value is next added the expected loss increment involved in replacing the or each temporary fusion splice with two permanent fusion splices required for insertion of the previously omitted length of amplifying fibre. Unfortunately there can be an unacceptably large discrepancy between the computed value of the aggregate loss and the value actually resulting from the splicing-in of the amplifying fibres.

It would therefore be beneficial to be able to include, within an amplifier that includes a gain flattening filter, a neutral density filter whose attenuation could be trimmed after completion of the construction of that amplifier. Such a neutral density filter could then be used to optimise the gain flattening for a pre-set value of amplifier external gain. (For the purposes of this specification the term 'neutral density filter' is employed in the context of an optical amplifier, to mean a filter having a spectral attenuation characteristic that is substantially flat over the amplification waveband of that amplifier.) Such a neutral density filter could additionally be used to compensate for the effects of small changes in fibre recipe that are typically found to occur along the length of a reel of amplifier whose composition is nominally the same throughout, and to also compensate for small changes between amplifying fibres derived from different reels. In this context, a reel of fibre may comprise several kilometers of fibres all drawn from a single fibre preform of nominally uniform composition.

SUMMARY OF THE INVENTION

It is an object of the present invention to provide a construction of a gain tilt exhibiting optical amplifier that incorporates a gain flattening filter, the construction including a trimming facility by means of which the gain tilt of the assembled amplifier at a predetermined value of external gain provided by the amplifier can be adjusted. Preferably the range of adjustment is tailored so that the gain tilt can be adjusted to match the gain tilt for which the gain flattening filter is designed to provide optimum gain flattening.

This trimming facility is provided by a neutral density filter the value of whose attenuation is capable of being trimmed subsequent to the assembly of the components of the amplifier. This neutral density filter is formed in a length of optical fibre, typically but not necessarily at a fusion splice in such a fibre. The trimming of the value of its attenuation is accomplished by repetitively re-fusing a localised region of the fibre, such repetitive re-fusing serving to raise incrementally the magnitude of the attenuation provided. In the making of any individual neutral density filter, the individual re-fusings, which are typically accomplished by means of an electric arc, are not necessarily each of the same temperature and/or duration.

The production of such a neutral density filter has features in common with the method for making an attenuator that is described in United Kingdom Patent Application GB 2 128 766A, but is distinguished from that method in at least two important respects. One of these is that GB 2 128 766A teaches the use of a single fusion process, the duration of which determines the attenuation value obtained. This contrasts with the repetitive re-fusion employed in the present invention. Repetitive re-fusion has the advantage that the attenuation value can be monitored between consecutive re-fusings. When the desired attenuation value is approached the durations of the re-fusings can be shortened in order to reduce the risk of overshooting the desired value. Another difference concerns the type of fibre in which the neutral density filter is made. Attempts to produce by this method a neutral density filter for use in the amplification waveband of an erbium doped fibre amplifier failed when attempts were made using standard 1550 nm transmission fibre (i.e. fibre having a cut-off wavelength of about 1450 nm). Though this did produce neutral density filters, the process was found to be insufficiently controllable and repeatable to be useful. Each re-fusing is expected to produce a attenuation increment, and no mechanism is provided for producing a controlled attenuation decrement.

Accordingly, in order to produce a neutral density filter possessing a specific attenuation, it is necessary to start with a structure possessing a lower value of attenuation, and then increment its attenuation in a controlled way that precludes the possibility of a significant overshoot. With standard 1550 nm fibre, the loss increment provided by each refusing was found to vary, apparently randomly, by such a wide margin as to make it virtually impossible to reach a specific attenuation value in a controlled manner, particularly when that specific value significantly exceeded about 0.5 dB. However, when attempts were repeated, but this time using 980 nm fibre (i.e. fibre with a cut-off wavelength of about 930 nm) instead of standard 1550 nm fibre, it was found that repetitive re-fusion could readily be satisfactorily employed to provide attenuations in the erbium amplification band (1530–1560 nm) up to and exceeding 3.5 dB. The reason for the success is not fully understood but is attributed to the weaker waveguiding that results from the use of a fibre with a cut-off wavelength shorter than the short-wavelength end of the amplification waveband for which the filter is designed to operate as a neutral density filter.

The use of such neutral density filters allows the same design of gain flattening filter to be used in amplifiers using nominally the same recipe of gain fibre, but designed for optimised operation at different values of external gain. Additionally such use allows for compensation of the effects of small departures from recipe uniformity that are liable to occur over the length of a whole reel of amplifier fibre drawn from a single fibre preform, and also those occurring between amplifier fibres drawn from different preforms of nominally identical and uniform composition.

Other features and advantages of the invention will be readily apparent from the following description of preferred embodiments of the invention, the drawings and the claims.

BRIEF DESCRIPTION OF THE DRAWINGS

FIGS. 2 and 3 are plot illustrating effects of gain tilt, FIG. 7 is a table comparing the creation of a neutral density filter constructed in 980 nm fibre with one constructed in standard 1550 nm transmission fibre.

DETAILED DESCRIPTION OF THE PREFERRED EMBODIMENTS

There is a wide variety of known configuration of optical fibre amplifiers that can be adapted to include the neutral density filters of the present invention. Some configurations employ only a single length of amplifying fibre, whereas others employ a concatenation of two or more lengths; some employ co-pumping, others employ counter-pumping, yet others employ both co- and counter-pumping. Different configurations employ different arrangements of isolators. It is only by way of example that the particular embodiment of amplifier configuration now to be particularly described with particular reference to FIG. 1 is a configuration that employs only a single length of amplifying fibre, a length which is co-pumped.

Figure 1:
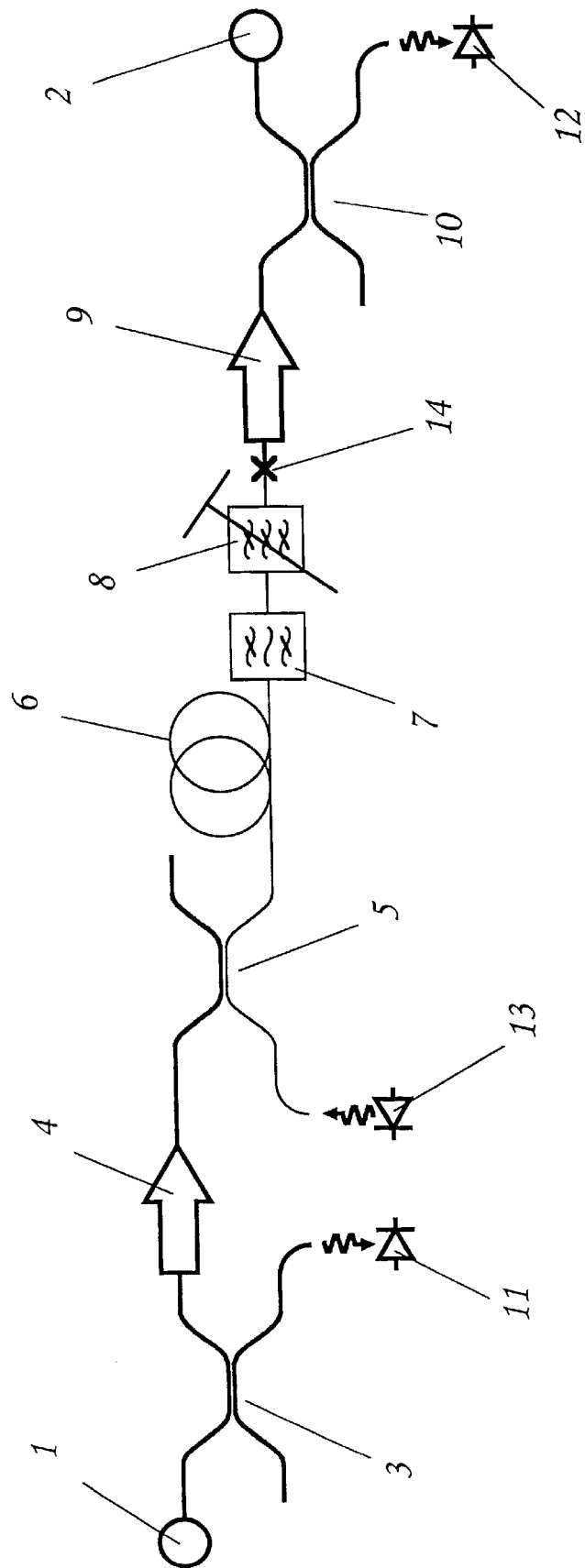
FIG. 1 is a schematic diagram of an optical amplifier embodying the invention in a preferred form.

Referring to FIG. 1, an optical amplifier has an input port 1 optically coupled with an output port 2 via a first waveguide coupler 3, a first isolator 4, a second waveguide coupler 5, a length of erbium doped fibre 6, a gain flattening filter 7, a neutral density filter 8, a second isolator 9 and a third waveguide coupler 10.

The first waveguide coupler 3 is a coupler that taps a small amount of any signal power applied to the amplifier, and feeds that tapped power to an input signal power monitor photodiode 11. It is a coupler constructed from two lengths of standard 1550 nm transmission fibre (i.e. fibre having a cut-off wavelength of about 1459 nm). The third waveguide coupler 10 has the same construction as the first waveguide coupler 3, its function being to tap a small amount of signal power and feed that tapped power to an output signal power monitor photodiode 12. The second waveguide coupler 5 is a wavelength multiplexing coupler constructed from one length of standard 1550 nm transmission fibre and one length of 980 nm fibre (i.e. fibre having a cut-off wavelength of about 930 nm). In FIG. 1 the two types of fibre have been distinguished by employing thicker lines to depict 1550 nm fibre, and thinner lines to depict 980 fibre. The length of 980 nm fibre of waveguide coupler 5 extends from a diode laser optical pump 13, emitting at 980 nm, to the erbium doped optical fibre 16, which is also 980 nm fibre. The wavelength multiplexing coupler 5 is wavelength multiplexing between the pump wavelength and the signal waveband that is amplified by the erbium doped fibre 6.

The gain flattening filter 7 is a filter constructed from a concatenation of two or more filter sections, each constructed in 980 nm fibre, using the method described in U.S. Pat. No. 5,708,740 that involves creating in that fibre a regularly spaced set of sharply localised non-adiabatic biconical tapers. The neutral density filter 8 is also constructed in 980 nm fibre, and is formed by repetitive localised fusing of a short section of that 980 nm fibre. Conveniently this localised fusing is performed using a jig (not shown) designed for performance of the localised fusing operation entailed in the manufacture of a conventional optical fibre fusion splice. Typically the 980 nm fibre in which the neutral density filter is formed is a fibre provided with a plastics protective coating. This coating needs to be removed from the region of the fibre which will be subjected to the repetitive fusion. It is possible for this coating to be removed from an intermediate portion of the fibre, but it may be found easier to remove the coating from the ends of two fibres, to effect a fusion splice, and then to subject the fusion splice to repetitive re-fusion.

Both isolators 4 and 9 have fibre tails constructed in standard 1550 nm fibre, and so these elements have been depicted with the thicker lines. Since the neutral density filter 8 is constructed in 980 nm fibre, the junction between the neutral density filter 8 and the isolator 9 involves a hybrid fibre splice, i.e. a splice between fibres with significantly different waveguiding properties. This splice is specifically represented at 14. Other splices in the amplifier that are conventional splices between fibres with substantially similar waveguiding properties, such as the splice between isolator 4 and coupler 5, and that between gain fibre 6 and gain flattening filter 7, have not been specifically represented.

To give an illustration of how the attenuation of the neutral density filter affects the flatness of the external gain characteristic of the amplifier of FIG. 1, reference may be made to FIGS. 2 and 3. FIG. 2 depicts the external gain characteristic computed for a particular notional implementation of a FIG. 1 type amplifier. This amplifier is provided with a gain flattening filter optimised for gain flattening over the wavelength range 1530–63 nm when the amplifier is driven to provide an internal gain of 26 dB. In respect of FIG. 2, it is assumed that the internal passive losses amount to 5 dB, and that therefore the amplifier is delivering an external gain of 21 dB. In respect of FIG. 3, it is assumed that the internal losses amount of 3.5 dB, instead of 5 dB, and that therefore the drive need provide an internal gain of 24.5, instead of 26 dB, for the amplifier to deliver the same external gain of 21 dB at 1530 nm. Now, however the computed external gain characteristic is no longer flat, but rises from 21 dB at about 1530 nm to about 21.8 dB at about 1563 nm.

To make a specific amplifier designed for delivering a specific value of external gain using a specific gain fibre recipe, it is necessary to characterise the spectral gain characteristic of the internal gain of that gain fibre, and also to design a gain flattening filter having a complementary spectral loss characteristic. This might, for instance, be constituted by a filter designed to have the spectral loss characteristic that is complementary to the gain characteristic of a 12 meter length of the gain fibre when providing an internal gain of 16 dB at 1535.5 nm. It is then possible to derive empirically, for this particular gain fibre recipe, a family of internal gain values and gain fibre lengths for which the gain flattening filter will produce the same degree of gain flattening. In the case of the particular gain fibre recipe under consideration, increasing the internal gain to about 20 dB is found to require a compensating increase in gain fibre length to about 14.5 meters, while increasing the internal gain still further to about 26 dB is found to require a compensating increase in gain fibre length to about 18.5 meters.

Consider now the situation in which it is required to build a gain-flattened amplifier to deliver an external gain of 20 dB, and that, in the absence of a neutral density filter 8, the internal passive loss of the amplifier typically amounts to 4.5 dB±1.0 dB. Choosing to use the 18.5 meter length for the gain fibre 6, it is seen that by increasing the loss of the neutral density filter 8 to 0.5 dB will provide optimised gain flattening if the rest of the internal passive loss is at the top of the range (5.5 dB), whereas if it is at the bottom of the range (3.5 dB), the loss of the neutral density filter will need to be increased to 2.5 dB.

To obtain an estimate of what in practice the internal passive loss of the amplifier is likely to amount to, and hence be able to select an appropriate length for the gain fibre 6, all the components of the amplifier are assembled with the exception of the gain fibre 6. The place of the gain fibre 6 is temporarily taken by a temporary direct splice between the output end of the 980 nm fibre of coupler 5 and the input end of the 980 nm fibre of the gain flattening filter 7. The loss existing between input terminal 1 and output terminal 2 is then measured. This measured value (expressed in dB) may be added to the external gain value required of the amplifier, together with margins for extra loss potentially involved in replacing the temporary splicewith the gain fibre and for gain fibre recipe variance, to give a value of internal gain required. From this, in its turn can then be calculated the length requirement for the gain fibre.

Once the gain fibre has been spliced in, the amplifier is powered up and its spectral performance measured. From this can be ascertained the external gain value providing optimised gain flattening. Then the loss of the neutral density filter is increased to reduce this external gain value to the target value.

Figure 4:
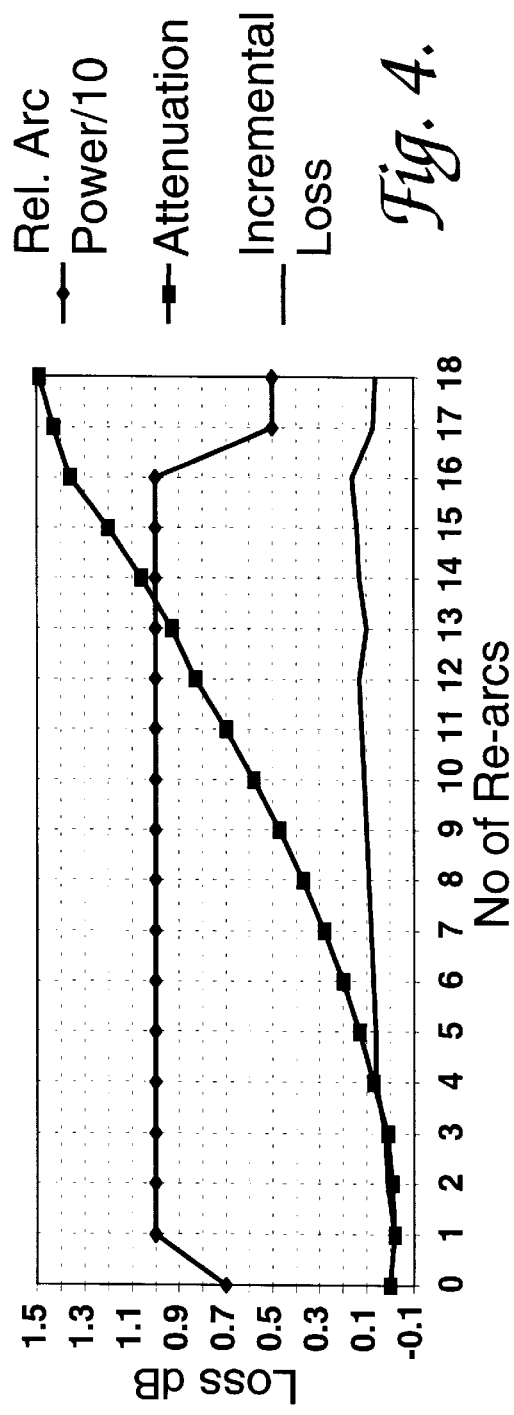
FIGS. 4 and 5 are plots describing the construction of specific neutral density filters.
Figure 5:
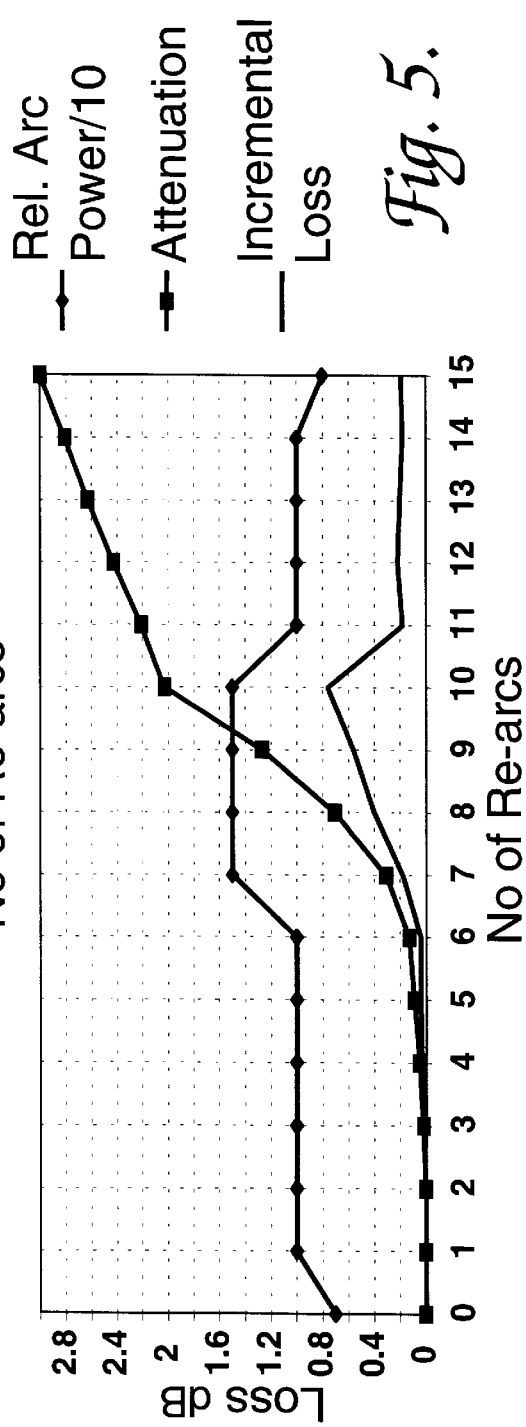

FIGS. 4 and 5 show, in respect of two different neutral density filters 8, how the repetitive re-fusings were performed to achieve their respective required attenuation values. In respect of the neutral density filter 8 of FIG. 4, 18 re-fusings were employed to reach the target attenuation of 1.5 dB. The first 16 of these re-fusings used the same fusion arc power, which was somewhat greater than that employed for effecting the initial fusion splice. For the last two re-fusings, the arc power was less than that employed for effecting the initial fusion splice. In respect of the neutral density filter 8 of FIG. 4 the target attenuation was greater, 3 dB, but achieved with a smaller number of re-fusings, 15 instead of 18, by increasing the fusion arc power in two steps, and later reducing it again also in two steps.

Figure 6:
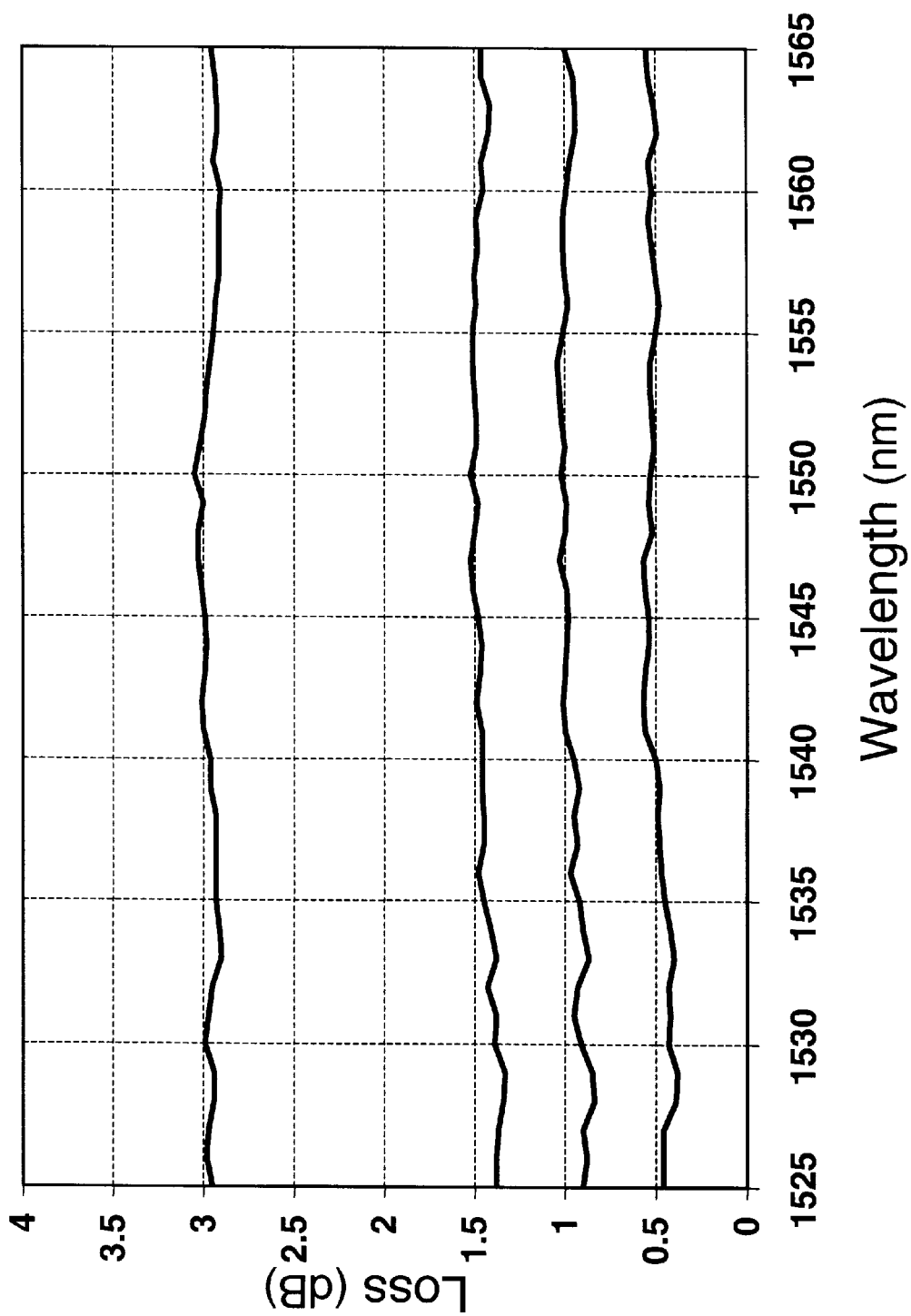
FIG. 6 depicts the spectral characteristics of specific examples of neutral density filter.

FIG. 6 depicts the measured spectral characteristics of four different examples of neutral density filter 8, and shows in each case a wavelength dependence of less than 0.2 dB over the spectral range 1525 to 1565 nm. Though not shown in this figure, similar performance has been demonstrated out to 1610 nm. The temperature dependence was found to be less than 0.15 dB over the temperature range −20 to +80° C., while the polarisation dependence was found to be less than 0.05 dB.

Earlier reference has been made to the difficulties in using repetitive re-fusion in standard 1550 nm transmission fibre to produce, for use in the erbium amplification band, a neutral density filter of specific attenuation value, this being contrasted with the equivalent position when attempting the same process in 980 nm fibre. The results of an illustrative direct comparison are set out in tabular form in FIG. 7. (It so happened that the power in the arc used for re-fusion was, in respect of the making of the first neutral density filter of the comparison, increased from eight to ten arbitrary units after the sixteenth re-arc, and so the same regime was employed in the making of the second.) The short cut-off fibre was 980 nm fibre, while the long cut-off fibre was standard 1550 nm transmission fibre. The results of the comparison are also displayed in graphical form in FIG. 8.

Figure 8:
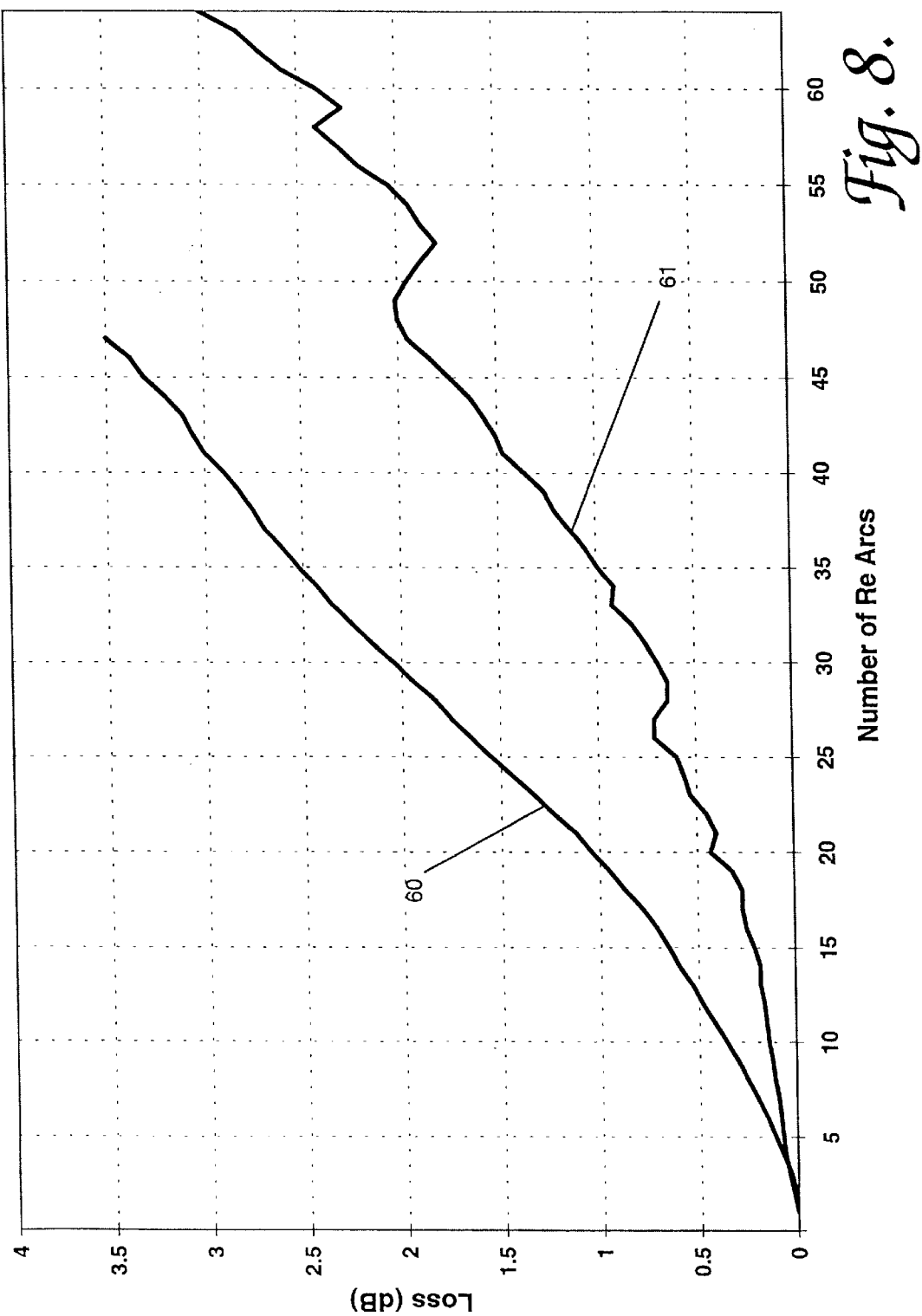
FIG. 8 depicts the results of the table of FIG. 7 in graphical form.

FIGS. 7 and 8 clearly show that, in the case of the 980 nm fibre neutral density filter, the attenuation increases smoothly with increasing number of re-arcs performed, thereby making it relatively easy to control the re-arcing process, terminating at the moment that the value of attenuation reaches close to a predetermined value, and also relatively easy to forecast how many re-arcs will be required for this purpose. In contrast, in the case of the 1550 nm fibre neutral density filter, the attenuation increments produced by each successive re-arc are seen to be much more irregular (sometimes even being negative increments, thereby making it much more difficult, if not impossible, to arrive at a value close a predetermined attenuation value.

What is claimed is:

1. In the manufacture of a gain tilt exhibiting optical amplifier having an external gain defined as the ratio between an input signal level power appearing at an optical input of the amplifier and an output signal level power appearing at an optical output of the amplifier, which optical output is optically coupled with said optical input by an optical path that includes a passive structure providing optical loss and an active gain-providing region providing optical amplification over a finite amplification waveband, which optical path includes at least one length of optical fibre having a cut-off wavelength shorter than wavelengths with the amplification waveband, a method of adjusting, after assembly of said optical path, the gain tilt exhibited at any given value of the external gain by producing a controlled optical loss increment provided by the passive structure by performance of an iteration of localised fusion operations upon a localised region of said length of optical fibre.

2. A method as claimed in claim 1, wherein the iteration of localised fusion operations includes fusion operations of different temperatures and/or durations.

3. A method as claimed in claim 1, wherein the iteration of localised fusion operations is performed at the location of a fusion splice.

* * * * *